United States Patent
Horiuchi et al.

[11] Patent Number: 5,941,597
[45] Date of Patent: *Aug. 24, 1999

[54] STRUCTURAL MEMBER OF VEHICLE

[75] Inventors: Sumio Horiuchi; Nobuo Hosaka, both of Wako, Japan

[73] Assignee: Honda Giken Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/887,047

[22] Filed: Jul. 2, 1997

Related U.S. Application Data

[63] Continuation of application No. 08/434,390, May 3, 1995, abandoned.

[30] Foreign Application Priority Data

May 24, 1994 [JP] Japan ................................ 6-132399

[51] Int. Cl.[6] .................................................. B62D 25/00
[52] U.S. Cl. ........................ 296/203.01; 296/203.03; 296/205; 296/30; 296/188; 52/735.1
[58] Field of Search ................................ 296/146.6, 30, 296/29, 188, 203–205, 209, 194, 195; 280/784; 52/732.1, 735.1, 736.1, 736.3, 736.4, 737.4, 737.5

[56] References Cited

U.S. PATENT DOCUMENTS

| | | | |
|---|---|---|---|
| 2,027,898 | 1/1936 | Broulhigt | 280/798 X |
| 3,292,969 | 12/1966 | Eggert, Jr. | 296/205 |
| 3,724,153 | 4/1973 | Wessells III et al. | 296/203 |
| 3,975,046 | 8/1976 | Dutil | 296/183 |
| 4,618,163 | 10/1986 | Hasler et al. | 296/205 X |
| 4,826,238 | 5/1989 | Misono et al. | 296/205 |
| 5,255,487 | 10/1993 | Wieting et al. | 296/188 |
| 5,411,308 | 5/1995 | Kreis et al. | 296/30 |
| 5,458,393 | 10/1995 | Benedyk | 296/203 |
| 5,466,032 | 11/1995 | Clausen et al. | 52/732.1 X |

FOREIGN PATENT DOCUMENTS

| | | | |
|---|---|---|---|
| 3606024 | 8/1987 | Germany | 296/188 |
| 4016730 | 11/1991 | Germany | 296/205 |
| 4026459 | 2/1992 | Germany | 296/146.6 |
| 60-135375 | 7/1985 | Japan . | |
| 5038992 | 2/1993 | Japan | 296/146.6 |
| 8302575 | 8/1983 | WIPO | 296/188 |

*Primary Examiner*—Dennis H. Pedder
*Attorney, Agent, or Firm*—Armstrong, Westerman, Hattori, McLeland, & Naughtoin

[57] ABSTRACT

A structural member having a closed section of vehicle formed by plate members of light alloy, such as a front pillar of vehicle formed by an outer panel, pillar stiffener and inner pillar made of light alloy, is reinforced by a reinforcing member made of extruded light alloy material which has a substantially same outer shape as an inner shape of the closed section of the structural member and is fitted into the closed section portion. A higher reinforcing effect can be attained if the iron member such as a steel pipe and a steel plate or the like are arranged along a hollow portion of the reinforcing member

3 Claims, 4 Drawing Sheets

STRUCTURAL MEMBER OF VEHICLE

This application is a continuation of application Ser. No. 08/434,390 filed May 3, 1995, now abandoned.

BACKGROUND OF THE INVENTION

This invention relates to a structural member of vehicle such as automobile, and more particularly the structural member formed by connecting plate members of light alloy to each other.

It is sometimes found that a chassis of automobile is made of light alloy such as aluminum alloy in order to provide light weight of it and the chassis is provided with various structural members formed by connecting plate members of light alloy.

FIG. 1 is a schematic perspective view for showing one example of a chassis structure of automobile, wherein a side body forming a side surface of the chassis is constituted by a front pillar 1, a center pillar 2 and a rear pillar 3, extending in an upward and downward direction respectively, a roof side rail 4 extending in a forward and rearward direction at upper parts of the pillars and a side sill 5. All these members are structural members having closed sections.

Roof rails 6 connecting the right and left roof side rails, floor frames 7 reinforcing a floor a arranged between the right and left side sills 5 and cross members 8 are also formed by the structural members with closed sections as described above, further each of a pair of right and left front side frames 9 and front upper members 10 extending from a compartment part b toward a forward engine room c are also similarly formed by the structural members with closed sections.

As a means for increasing rigidity of such a structural member having a closed section as described above, prior arts have employed either an increasing of a wall thickness of the member or an enlarging of a section of the member and the like.

However, since Young's modulus of aluminum member is about ⅓ of that of iron and steel member, in the structural member having a closed section formed by plate members of light alloy, even if rigidity is tried to be increased by increasing thickness of the aforesaid plate member, sufficient effect similar to that of the structural member formed by steel plates can not be attained, resulting in that it becomes necessary to enlarge a section of the member and thus various problems may occur.

That is, enlargement of sections of pillars 1, 2 and 3 causes attaining of a superior field of sight to be difficult and a space in the compartment room to be narrowed. Enlargement of sections of the roof side rails 4 and roof rails 6 similarly causes the space in the compartment room to be narrowed or a vehicle height to be increased. Also in the case that the section of each of the side sills 5 is enlarged, the space in the compartment room is narrowed, in addition, riding-on or riding-off characteristic is deteriorated and there occurs a certain difficulty in assuring a ground height of the side sills 5.

A similar effect may occur as for the floor frames 7 and the cross members 8, wherein if their sections are enlarged, a space in the compartment room is narrowed in the case that they are installed in the compartment room and in turn in the case that they are installed outside the compartment room, i.e. below the floor a, a certain difficulty may occur in view of assuring the ground height. In addition, enlargement of a section of each of the front side frames 9 and the front upper members 10 causes a volume of the engine room to be hardly widened.

In view of this fact, Japanese Patent Laid-open No. Sho 60-135375 has a proposal in which the structural members having closed sections are constructed by extruded light metal, although it becomes necessary to arrange connectors between the structural members having closed sections for connecting them, shapes of the structural members having closed sections and the connectors become complex and a high accuracy for them is required.

SUMMARY OF THE INVENTION

Accordingly, it is an object of the present invention to provide structural members having closed sections of vehicle in which a higher rigidity can be assured without making the section larger as compared with that of the prior art and without providing any complex shape.

In order to achieve the above object, the present invention provides a structural member of vehicle which is formed by plate members of light alloy characterized in that a reinforcing member made of light alloy extruded material is arranged along and connected to the structural member.

Also, the present invention provides a structural member with a closed section of vehicle which is formed by plate members of light alloy characterized in that a reinforcing member made of light alloy extruded material is arranged along and connected to an inner side of said closed section within the structural member.

In addition, the present invention provides a structural member with a closed section of vehicle which is formed by plate members of light alloy characterized in that a reinforcing member made of light alloy extruded material having a substantially same outer shape as an inside shape of said closed section is fitted to an inner side of said closed section within the structural member.

According to the present invention, since the structural member formed by plate members is reinforced by the extruded member, the structural member can be reinforced efficiently and given a high rigidity without being required any complex shape and high accuracy. Further, since the inner space in the structural member having a closed section is utilized to fit the reinforcing member therein, the structural member having a closed section can be reinforced without enlarging the outer shape of section of the structural member, resulting in that it is possible to increase rigidity of the structural member having a closed section without causing aforesaid various problems. In other words, since a high rigidity is given to the structural member having a closed section with the reinforcing member fitted inside the structural member as described above, an outer shape of section of the structural member can be made as small as possible, a superior field of view and a wide compartment room space or the like can be assured and a degree of freedom in design of outer appearance of vehicle is increased.

Since the reinforcing member is made of light alloy extruded material, the reinforcing member itself has a strength and a rigidity sufficient for reinforcement, and the reinforcing member is closely contacted with and extended along the structural member, resulting in that it performs a well efficient reinforcing function. In addition, if the reinforcing member is of light alloy extruded material having a substantially same outer shape as an inner shape of the closed section, it is closely contacted with an inner surface of the closed section portion and performs a well efficient reinforcing function. Additionally, by means of such a reinforcing member as described above, it is possible to effectively reinforce the structural member having the closed section with a small number of component parts.

If an iron member such as an iron plate or an iron pipe is arranged along the aforesaid reinforcing member made of light alloy extruded material in the longitudinal direction, it is possible to further increase rigidity of the structural member having a closed section.

BRIEF DESCRIPTION OF THE DRAWINGS

FIG. 4 is a cross sectional view which is similar to

FIG. 2 for showing another preferred embodiment of the present invention;

DESCRIPTION OF THE PREFERRED EMBODIMENT

Figure 1:
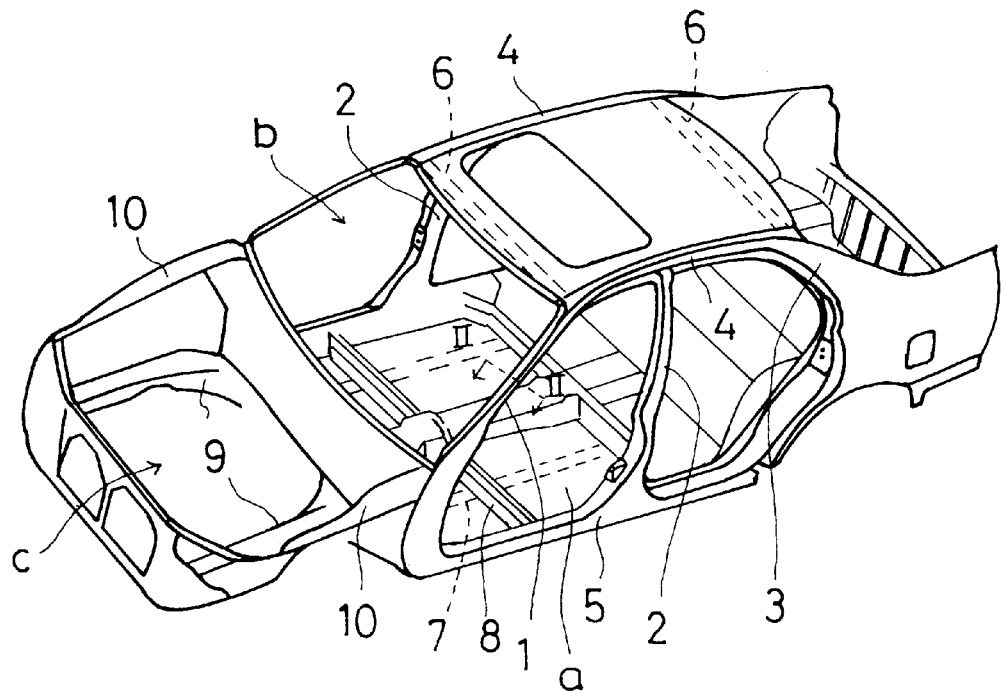
FIG. 1 is a schematic perspective view for showing one example of a chassis structure of a vehicle.
Figure 2:
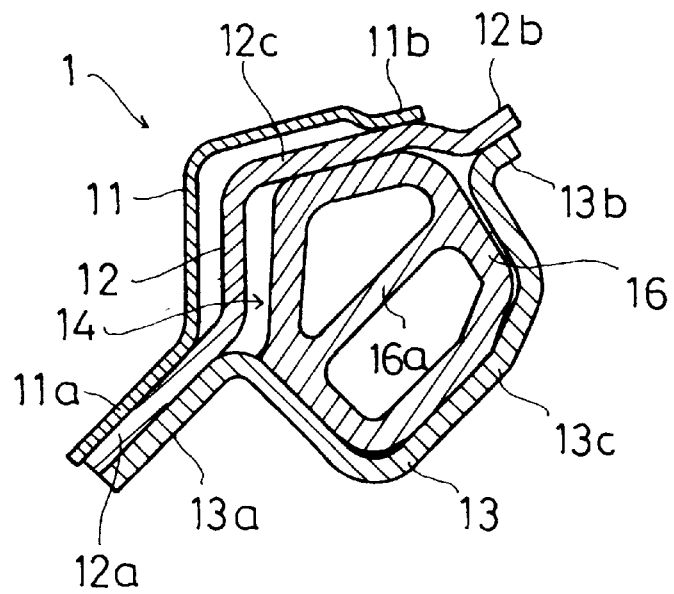
FIG. 2 is a cross sectional view of a front pillar according to one preferred embodiment of the present invention.
Figure 3:
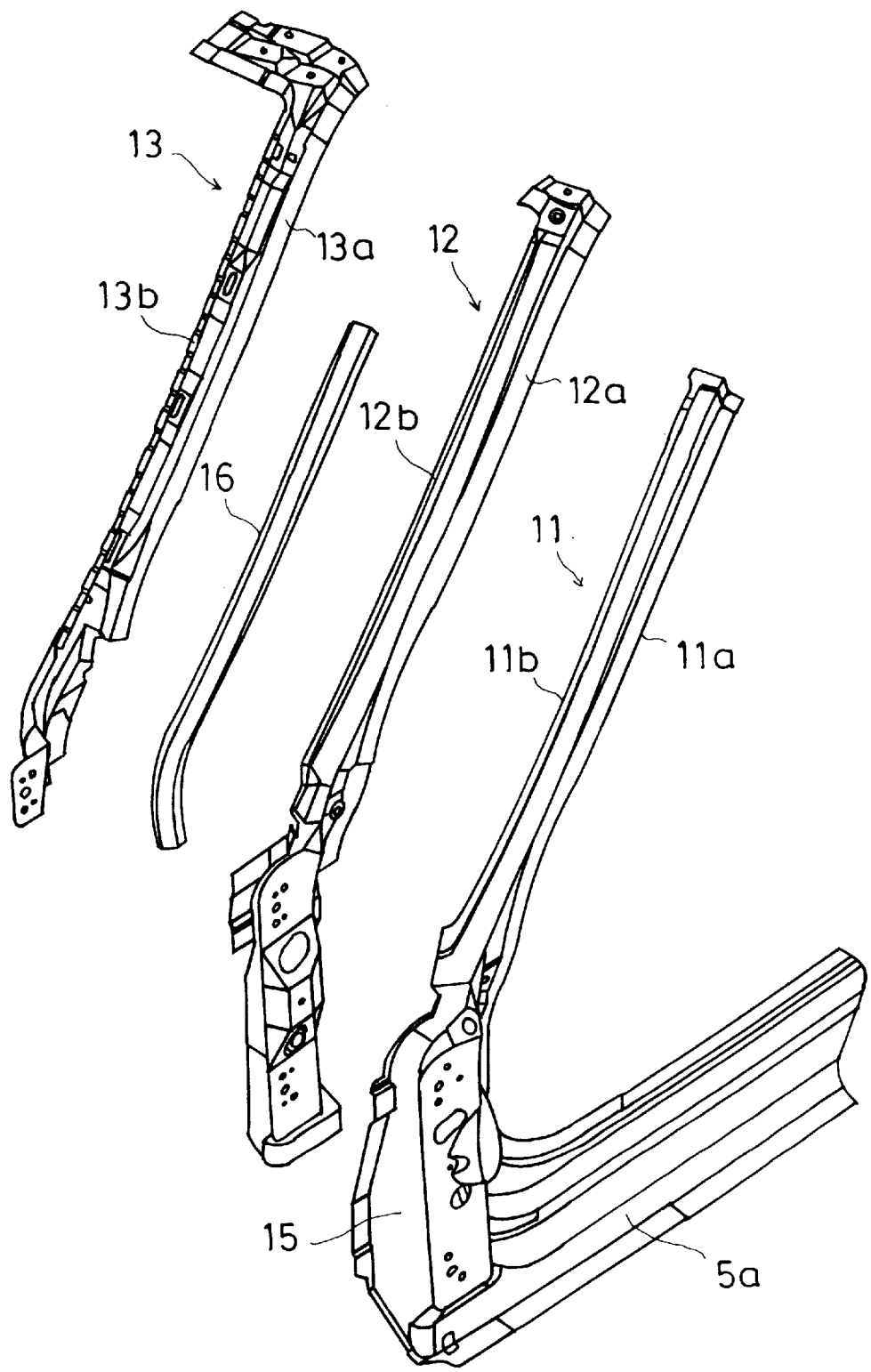
FIG. 3 is an exploded perspective view of the front pillar.

FIGS. 2 and 3 illustrate one preferred embodiment of the present invention in which the present invention is applied to the front pillar 1 shown in FIG. 1. FIG. 2 is a cross sectional view of the front pillar 1 of the present preferred embodiment and corresponds to a sectional view taken along a line II—II of FIG. 1. FIG. 3 is an exploded perspective view of the front pillar 1.

The front pillar 1 is basically composed of an outer panel 11, a pillar stiffener 12 and an inner pillar 13. These members, i.e. all the outer panel 11, pillar stiffener 12 and inner pillar 13 are elongated fine members extending in an upward and downward direction which are made by forming plate members of light alloy. Flange portions 11a, 12a and 13a arranged along a rear edge of each of the members are overlapped each other and spot welded, thereby they are integrally assembled. The front edge of the outer panel 11 is fixed to the pillar stiffener 12 by spot welding the flange part 11b to the front outer surface of the pillar stiffener 12. The front edges of the pillar stiffener 12 and the inner pillar 13 are fixed to each other by overlapping and spot welding the flanges 12b and 13b together.

The pillar stiffener 12 and the inner pillar 13 are formed with curved portions 12c and 13c between the flanges 12a and 12b and between the flanges 13a and 13b, respectively, and the curved portions 12c and 13c project toward opposite sides to each other for forming a closed section portion 14 extending in a longitudinal direction along the front pillar 1. The curved portion 12c is different in shape from the curved portion 13c. The lower end of the outer panel 11 is connected to the outer panel 5a of the side sill through the connecting part 15.

The aforesaid structure is the same as that of the prior art front pillar, wherein a desired rigidity is given to the front pillar by forming the aforesaid closed section portion 14. Means normally applied in the front pillar having such a structure as above in order to further increase the rigidity, is to increase a wall thickness of the pillar stiffener 12 and the inner pillar 13 or to enlarge a section i.e. the outer shape of the closed section portion 14.

However, as described above, in the case of the structural member having a closed section made of light alloy, Young's modulus of the material is low, so that it is difficult to sufficiently improve the rigidity only by increasing wall thickness of the plate, and it becomes necessary to enlarge the section, thereby various problems as described above are caused. That is, as for the front pillar, it becomes difficult to assure a superior field of sight and a space in the compartment room is narrowed.

Accordingly, in the front pillar 1 of the preferred embodiment, a reinforcing member 16 is arranged and connected within an inner space of the closed section portion 14 and extended in a longitudinal direction along the inner space. The reinforcing member 16 is made such that a light alloy material is extruded to be formed into an integral hollow closed sectional shape, wherein a partition wall 16a is formed across the hollow part and it has a sufficient strength by itself. Then, its lower end is bent so as to be extended along the inner part of the pillar. In addition, an outer shape of the reinforcing member 16 is substantially the same as an inner shape of the closed section portion 14, the reinforcing member 16 is fitted within the closed section portion 14 while its outer surface being at least partially and closely contacted with the inner surfaces of the pillar stiffener 12 and the inner pillar 13, resulting in that a superior transfer of force among the pillar stiffener 12, the inner pillar 13 and the reinforcing member 16 is carried out and then the front pillar 1 composed of the pillar stiffener 12 and the inner pillar 13 is efficiently reinforced by the reinforcing member 13.

Arranging and connecting of the reinforcing member 16 in the closed section portion 14 may be carried out such that after the reinforcing member 16 is connected to the inner pillar 13 by means of welding or adhesion or rivets or screws, the pillar stiffener 12 and the inner pillar 13 are assembled, and then the flange portions 12a, 13a and flange portions 12b, 13b are spot welded. In place of that, the reinforcing member 16 may be fitted in the closed section portion 14, thereby it is possible to perform the arranging and connecting of the reinforcing member 16 quite easily. In this way, the front pillar 1 can be effectively reinforced with a small number of component parts.

A sectional outer shape of the front pillar 1 reinforced by the reinforcing member 16 in this way is not enlarged as compared with that of the prior art. Accordingly, it is possible to assure and maintain a superior field of view as well as a sufficient space of compartment room. In addition, application of the aforesaid reinforcing member enables a sectional outer shape of the front pillar to be as small as possible and a superior field of view and a wide space of compartment room to be attained and so a degree of freedom in design of vehicle outside view is increased. Referring to FIG. 3, the exploded view shows that the outer panel 11 is mounted on the pillar stiffener 12 along the entire length thereof.

Figure 4:
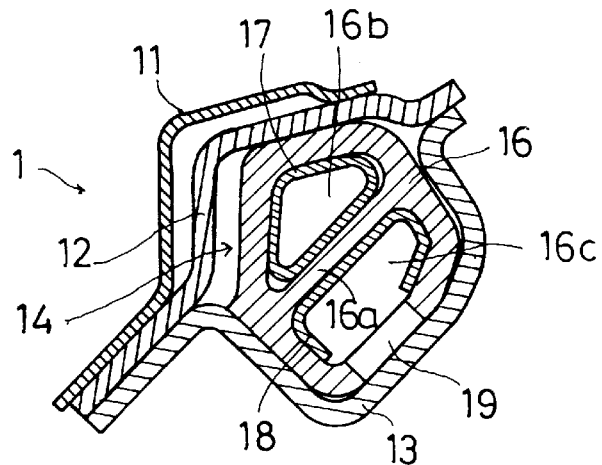

FIG. 4 is a cross sectional view of the front pillar 1 of another preferred embodiment of the present invention. This front pillar 1 is also composed of the outer panel 11, pillar stiffener 12, inner pillar 13 and reinforcing member 16 which are similar to those of the aforesaid preferred embodiment. The reinforcing member 16 is made of the extruded light alloy material in the same manner as that of the aforesaid preferred embodiment, and has hollow portions 16b, 16c partitioned by a partition wall 16a in it. Within each of these hollow portions 16b, 16c is arranged an iron member, respectively. That is, a steel pipe 17 having a substantial same sectional shape as that of the hollow portion 16b is fitted into the hollow portion 16b while its outer circumferential surface is set along an inner circumferential surface of the hollow portion 16b. In the hollow portion 16c is fitted a steel plate 18 bent and formed into a shape extending along the inner circumferential surface.

Since a rigidity of the reinforcing member 16 itself is substantially increased by these steel pipe 17 and the steel plate 18, a rigidity of the front pillar 1 reinforced by this reinforcing member 16 is further increased.

It is not necessarily required to provide the reinforcing member 16 with a closed sectional shape as shown in FIG. 2 and a slit 19 extending in a longitudinal direction may be formed at a circumferential wall of the reinforcing member as shown in FIG. 4.

Figure 5:
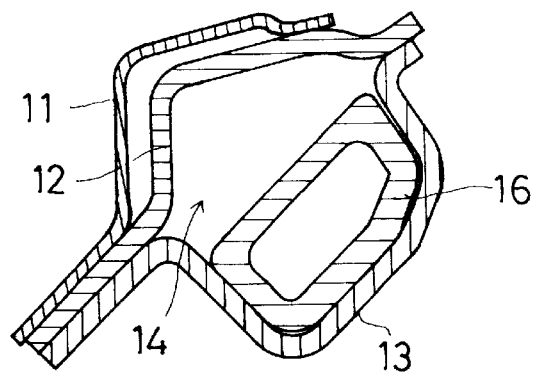
FIG. 5 is a cross sectional view which is similar to FIG. 2 for showing a still another preferred embodiment of the present invention.
Figure 6:
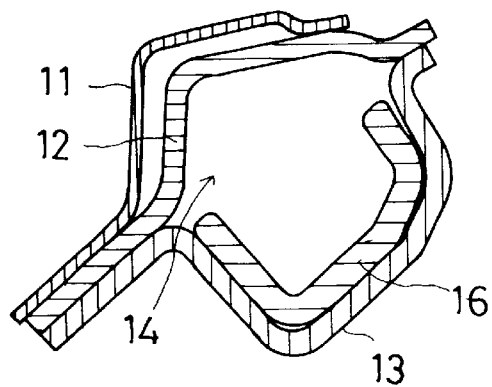
FIG. 6 is a cross sectional view which is similar to FIG. 2 for showing a still further preferred embodiment of the present invention.

In addition, as shown in FIGS. 5 and 6, the reinforcing member may have partly a substantially same outer shape as a part of the inner shape of the closed section and the shape is properly selected in response to a required rigidity and strength.

Figure 7:
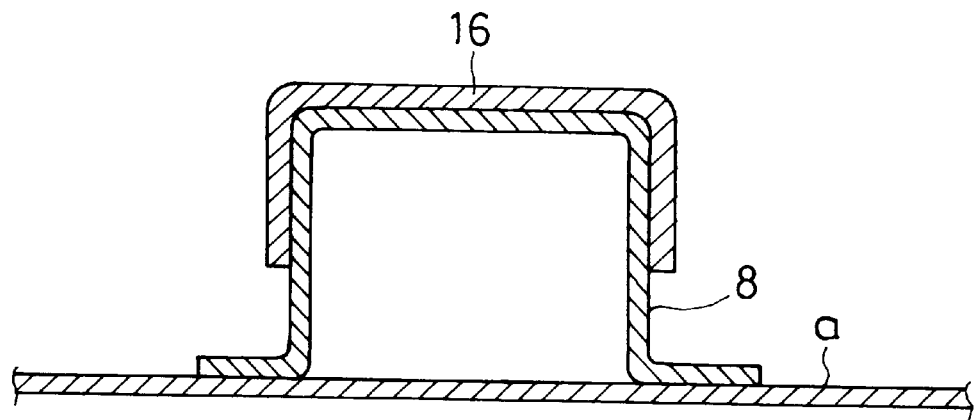
FIG. 7 is a sectional view for showing a preferred embodiment wherein the present invention is applied to a cross member of a floor.

Although the preferred embodiment in which the present invention is applied to the front pillar 1 has been described as above, the present invention can be applied not only to the front pillar, but also to various kinds of structural members having closed section of vehicle as described above, and the cross member 8 arranged below a seat, for example, may be provided with a reinforcing member 16 having a substantially same inner shape as a part of the outer shape of the closed section as shown in FIG. 7. According to the present invention, thus, the rigidity of the structural members can be increased without causing any disadvantages due to an enlarged section as described above.

Figure 8:
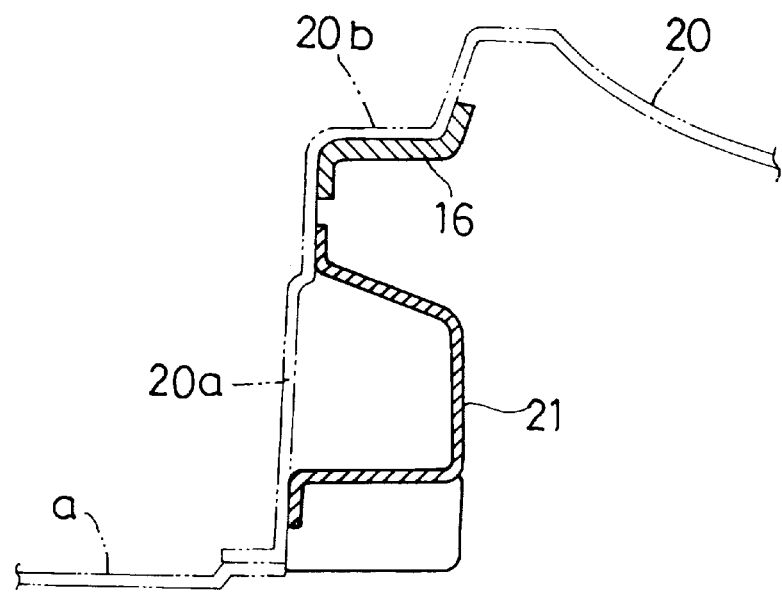
FIG. 8 is a sectional view for showing a preferred embodiment wherein the present invention is applied to a rear floor part.

In addition, it is of course apparent that the reinforcing member can be arranged at and connected to a part requiring rigidity and strength of a plate-like composing member such as the rear floor shown in FIG. 8 and further the reinforcing member can be arranged along and connected to the composing member having an open section. In FIG. 8, reference numeral 20 denotes a rear floor panel which is connected to the front floor a through a rising part 20a. The rising part 20a is provided with a cross member 21, and the reinforcing member 16 made of extruded light alloy material is arranged along and connected to the plate-like composing member part 20b above the cross member 21 so as to reinforce the part 20b.

According to the present invention, since the structural member formed by the light alloy plate material is reinforced by the extruded light alloy material, the member can be efficiently reinforced to obtain a large rigidity without complicating its shape and further without requiring high accuracy of the shape. In addition, rigidity of the structural member having closed section of vehicle formed by the light alloy plate can be increased without enlarging its sectional shape and it is further possible to get the structural member of closed section as described above having a high rigidity while preserving a relatively small sectional shape.

What is claimed is:

1. A structural member of a vehicle comprising:

at least first and second opposing plate members, wherein each plate member is made of a light alloy, and each plate member has a pair of flanges and a curved section connecting said flanges, wherein said curved section of said first plate member is different in shape from said curved section of said second plate member, said first and second plate members being connected to each other at said flanges to form a closed section with a non-uniform cross section varying in a longitudinal direction thereof;

an outer panel mounted to said plate member along an entire length thereof and having a connecting part for connecting said structural member to an outer panel of another structural member of a body of said vehicle; and a reinforcing member made of a light alloy of an extruded material, arranged in said longitudinal direction, and connected to an inside of said closed section within said first and second plate members, wherein said reinforcing member has a partition wall, wherein said partition wall divides a first closed cross section from a second closed cross section, and wherein any one of said first and second closed cross sections have a steel member formed along a part of a circumference thereof.

2. The structural member of said vehicle as set forth in claim 1, wherein said reinforcing member has a slit therein.

3. The structural member of said vehicle as set forth in claim 2, wherein said slit generally corresponds to said part of said circumference of said closed cross section that does not have a steel member therealong.

\* \* \* \* \*